Dec. 23, 1924.

M. M. KOHN 1,520,501

ELECTRICAL FOOD AND BEVERAGE PREPARING DEVICE

Filed Jan. 22, 1921

Inventor:
Milton M. Kohn,
by Wolfe Rhoades
Attys.

Patented Dec. 23, 1924.

1,520,501

UNITED STATES PATENT OFFICE.

MILTON M. KOHN, OF NEW YORK, N. Y.

ELECTRICAL FOOD AND BEVERAGE PREPARING DEVICE.

Application filed January 22, 1921. Serial No. 440,642.

*To all whom it may concern:*

Be it known that I, MILTON M. KOHN, a citizen of the United States, residing at New York, in the county of New York and State of New York, have invented certain new and useful Improvements in Electrical Food and Beverage Preparing Devices, of which the following is a specification.

My invention relates to an electrical heating apparatus and one specifically intended for preparing beverages, such as coffee, tea, etc., or various kinds of foods.

Figure 1:
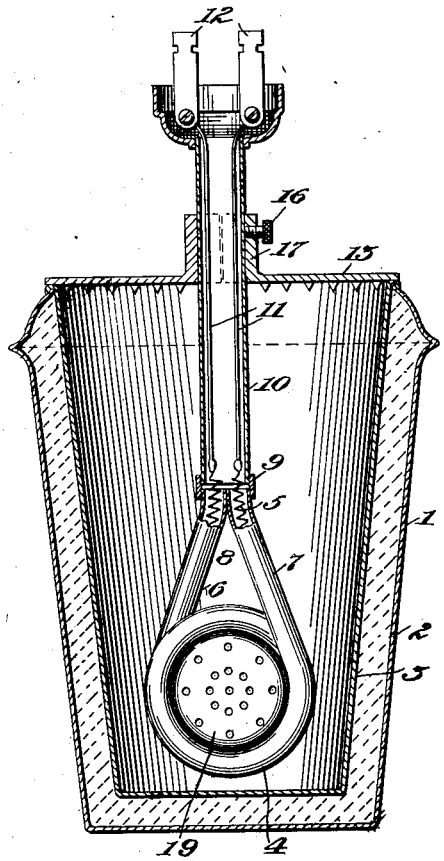
Figure 2:
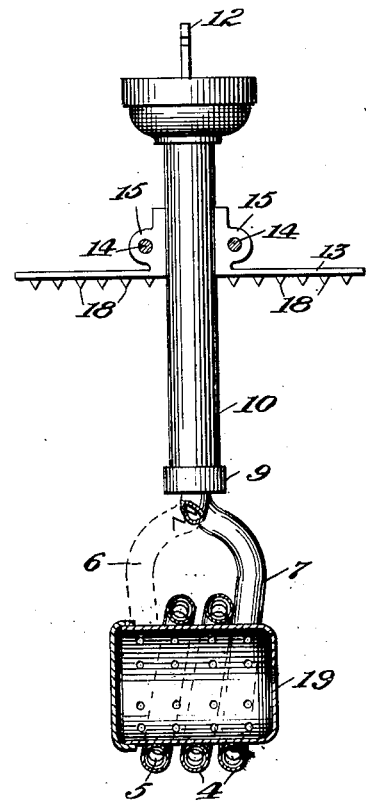

Referring to the drawings, Fig. 1 is a cross sectional view of my complete device, Fig. 2 being a section at right angles to Fig. 1, with the container removed.

1 designates a container, preferably of the heat insulated type, and it may consist of two walls 2 and 3 having therebetween some heat insulating medium, which may be of the solid variety, or may be air, or the space between the two walls may be evacuated. The tube 4 is formed as a cylindrical spiral and within this tube are electrical heating elements 5 of metal or other resistance material, which may be suitably insulated from the tube 5 if the latter be of metal. The two ends of the spiral 6 and 7 are brought together as at 8 and are suitably joined to a cylindrical sleeve 9, soldering being the preferred method of joining.

United to this sleeve 9 is a tube 10, the union being effected by means of solder or by screwing the lower end of the tube into the sleeve, suitable screw threads being provided. Within the tube 10 are the leads 11, one united to each end of the coil, and at the ends of the leads are the terminals 12 of any well known type. A two-part cover 13 is provided for the container, and the two parts may be joined together around the tube 10 by means of the screws 14 passing through lugs 15 on the cover. A screw 16 is provided for the purpose of supporting the heating element within the container and passes through a collar 17 on the cover and the end thereof abuts against the tube 10.

The coiled part of the tube 4 is so proportioned as to hold within it by frictional engagement a receptacle 19 which is often desired to be of the perforated type for containing the coffee, tea or other beverage or food product to be cooked or extracted.

The inner surface of the cover is provided with a number of projections 18 which serve for breaking the bubbles and thus preventing overflow of the liquid by reason of foaming. These projections may be sharp pointed, blunt, long or short; they may be in the form of coils or chains, or almost any other form, the sole requirement being that a solid part project deep into the froth, upon which the bubbles can break.

In operation the container 1 of my device is suitably filled with the desired liquid, as for example water, and the coil supporting the receptacle 19, having within it the beverage or food product, is inserted in the liquid preferably near the bottom of the container. Upon turning on the current the liquid is heated locally by the coils at points in very close proximity to the material within receptacle 19. This local heating causes convection currents which produce a circulation of all the liquid through the receptacle 19. Should any froth or foam be formed at the top it will be broken up by the projections 18.

The receptacle 19, containing the beverage or food product, and which is surrounded and supported by the electrical heating element 4, is also adapted for use without the container 1 and the cover 13, where it is desired to prepare a food by heating directly.

I claim:

1. An electrical food and beverage preparing device comprising a container, means for supporting the food or beverage producing material within and near the bottom of the container and a heating means surrounding the supporting means.

2. An electrical food and beverage preparing device comprising a container having heat insulating walls, means for supporting the food or beverage producing material near the bottom of the container and heating means surrounding the supporting means.

3. An electrical food and beverage preparing device comprising a container, a cover therefor, bubble breaking means on said cover, said cover supporting a heating means, said heating means supporting a means for retaining the food or beverage producing material.

4. In a device of the class described, a container, a cover therefor, bubble breaking means on said cover, said cover supporting a heating means, said heating means supporting a means for retaining the food or beverage producing material near the bottom of the container.

5. In a device of the class described, a container, a two part cover for said container, said two parts being associated into a single cover, said cover supporting a heating member.

6. In a device of the class described, a container, a two part cover for said container, said two parts being associated into a single cover, said cover supporting a tube, electrical conductors within said tube, said tube supporting an electrical heating member, the resistors of which are connected to said electrical conductors.

7. In a device of the class described, a container, a two-part cover for said container, said two parts being associated into a single cover, said cover supporting a tube, electrical conductors within said tube, said tube supporting a heating element comprising a coiled pipe and electric resistance members within said coiled pipe, said resistance members being joined to said electrical conductors.

8. In a device of the class described, a container, a two-part cover for said container, said two parts being associated into a single cover, said cover supporting a tube, electrical conductors within said tube, said tube supporting a heating element comprising a coiled pipe and electrical resistance members within said coiled pipe, said resistance members being joined to said electrical conductors, and a receptacle for the food or beverage producing material supported by said coiled pipe.

9. A device for preparing solid or liquid foods consisting of an electrically heated conductor held within any suitable material which will rapidly conduct the generated heat, supporting means within said device for the retention of a receptacle for the food or beverage producing material, and a cover having bubble breaking means for supporting and retaining the device in any desired position and closing the container used for holding the material to be cooked.

10. In a device of the class described, a food receptacle, electrical heating means surrounding and supporting said receptacle, and bubble breaking means within the upper part of said receptacle.

11. In a device of the class described, a container, a cover therefor provided with bubble breaking means and supporting an electrical heating means, said electrical heating means surrounding and supporting a food receptacle near the bottom of the container.

12. A means for obviating froth or foam comprising an element adapted to project well into the foam.

13. A means for obviating froth or foam comprising a series of elements adapted to project well into the foam.

14. In a means for heating or cooking material which is liable to froth on heating, a container, a heater, and a bubble breaking means.

15. An electrical food and beverage preparing device comprising a container, means for supporting the food and beverage producing material, and a heating means supporting said supporting means within and near the bottom of the container.

16. An electrical food and beverage preparing device comprising a container, a heating means having coils, and means for supporting the food and beverage producing material supported by the coils.

17. An electrical food and beverage preparing device comprising a container, a heating means having coils near the bottom of the container, and means for supporting the food and beverage producing material supported by the coils.

18. An electrical food and beverage preparing device comprising a container, a cover therefor, a heating coil, and means for supporting the food and beverage producing material within said coil, said coil being supported by the cover.

19. An electrical food and beverage preparing device comprising a container, a cover therefor, bubble breaking means, a heating coil, and means for supporting the food and beverage producing material within said coil, said coil being supported by the cover.

In testimony whereof I affix my signature.

MILTON M. KOHN.